United States Patent
Noh et al.

(10) Patent No.: US 7,770,833 B2
(45) Date of Patent: Aug. 10, 2010

(54) CENTRIFUGAL BRAKE DEVICE FOR USE IN BAIT CAST REEL

(75) Inventors: Yong Sub Noh, Seoul (KR); Ki Jin Park, Incheon (KR)

(73) Assignee: Banax Co., Ltd., Bucheon (KR)

( * ) Notice: Subject to any disclaimer, the term of this patent is extended or adjusted under 35 U.S.C. 154(b) by 0 days.

(21) Appl. No.: 12/432,851

(22) Filed: Apr. 30, 2009

(65) Prior Publication Data
US 2010/0001112 A1  Jan. 7, 2010

(30) Foreign Application Priority Data
Jul. 3, 2008  (KR) ...................... 10-2008-0064308
Dec. 30, 2008  (KR) ...................... 10-2008-0136594

(51) Int. Cl.
*A01K 89/01* (2006.01)
(52) U.S. Cl. .................................. 242/289; 188/181 A
(58) Field of Classification Search ................ 242/285, 242/289, 301; 188/181 A
See application file for complete search history.

(56) References Cited

U.S. PATENT DOCUMENTS

| | | | |
|---|---|---|---|
| 6,003,798 A * | 12/1999 | Kim ........................... | 242/289 |
| 6,328,240 B1 * | 12/2001 | Sakaguchi et al. .......... | 242/289 |
| 6,364,230 B1 * | 4/2002 | Kawasaki .................... | 242/289 |
| 6,398,141 B1 * | 6/2002 | Kim ............................ | 242/289 |
| 6,908,054 B1 * | 6/2005 | Kim et al. .................... | 242/289 |
| 6,955,315 B2 * | 10/2005 | Hyun .......................... | 242/289 |
| 6,959,886 B1 * | 11/2005 | Rho ............................ | 242/289 |
| 6,966,517 B2 * | 11/2005 | Seo ............................. | 242/289 |
| 7,374,120 B2 * | 5/2008 | Hyun .......................... | 242/289 |

* cited by examiner

*Primary Examiner*—Emmanuel M Marcelo
(74) *Attorney, Agent, or Firm*—Ladas and Parry LLP

(57) ABSTRACT

A centrifugal brake device capable of preventing backlash of a bait cast reel by using the centrifugal force generated from a spool is disclosed. The centrifugal brake device includes a shoe housing engaged to one side of a spool and including a plurality of brake shoes disposed in a radial direction, a stopper positioned on an upper portion of the shoe housing to restrict the brake shoes, a stopper controller engaged to an upper portion of the stopper to control a lifting position of the stopper, a spool cover enclosing the shoe housing and including a brake ring engaged to an inner surface of the spool cover, the brake shoes coming into contact with the brake ring when the brake shoes are released from the stopper, a slide cam engaged to one side of the spool cover to control a lifting position of the stopper controller, with a spring being interposed between the slide cam and the spool cover, and an adjustment dial for gradually adjusting a lifting degree of the slide cam, the adjustment dial being provided with displacement portions on a surface thereof contacting the slide cam.

12 Claims, 9 Drawing Sheets

CENTRIFUGAL BRAKE DEVICE FOR USE IN BAIT CAST REEL

CROSS-REFERENCE TO RELATED APPLICATION

This application is based on and claims priority from Korean Patent Application No. 10-2008-64308 and 10-2008-136594, filed on Jul. 3, 2008 and Dec. 30, 2008, respectively in the Korean Intellectual Property Office, the disclosure of which is incorporated herein in its entirety by reference.

BACKGROUND OF THE INVENTION

1. Field of the Invention

The present invention relates to a bait cast reel, and more particularly, to a centrifugal brake device capable of preventing backlash of a bait cast reel by using the centrifugal force generated from a spool.

2. Description of the Prior Art

In case of casting a fishing line by using a bait cast reel, a fisher casts the fishing line with a bait, as he holds a reel body mounted on a fishing pole with his hands. In this instance, the fishing line passes describing a parabola from a spool of the reel, and the spool accelerates when the fishing line passes through a vertex of the parabola.

Thus, a backlash phenomenon happens, in which rotational speed of the spool is faster than unwinding speed of the fishing line from the spool. The fishing line which is not smoothly unwound from the reel gets tangled in the reel body due to the backlash phenomenon. In order to prevent the backlash phenomenon, skilled fishers push the upper portion of the spool with their thumbs when the fishing line is unwound from the spool. As a result, the rotational speed of the spool is equal to or slower then the unwinding speed of the fishing line.

Since the above-mentioned method of preventing the backlash is not suitable for unskilled fishers, a spool brake device for preventing the backlash by using centrifugal force generated from the rotation of the spool has been developed.

The conventional spool brake device is, however, adapted to control the rotational speed of the spool in the state a main cover is opened. Thus, there is a cumbersome in that the main cover is detached from the body during fishing.

SUMMARY OF THE INVENTION

Accordingly, the present invention has been made to solve the above-mentioned problems occurring in the prior art, and an object of the present invention is to provide a centrifugal brake device for use in a bait cast reel which can stably brake a spool by means of brake shoes that are moved in a diametrical direction of the spool by a centrifugal force generated from rotation of the spool.

Another object of the present invention is to provide a centrifugal brake device for use in a bait cast reel which can gradually control brake power of a spool by manipulating an adjustment dial, without detaching a main cover from a spool body.

In order to accomplish these objects, there is provided a centrifugal brake device for a bait cast reel comprising: a shoe housing engaged to one side of a spool and including a plurality of brake shoes disposed in a radial direction; a stopper positioned on an upper portion of the shoe housing to restrict the brake shoes; a stopper controller engaged to an upper portion of the stopper to control a lifting position of the stopper; a spool cover enclosing the shoe housing and including a brake ring engaged to an inner surface of the spool cover, the brake shoes coming into contact with the brake ring when the brake shoes are released from the stopper; a slide cam engaged to one side of the spool cover to control a lifting position of the stopper controller, with a spring being interposed between the slide cam and the spool cover; and an adjustment dial for gradually adjusting a lifting degree of the slide cam, the adjustment dial being provided with displacement portions on a surface thereof contacting the slide cam.

With the above description, the brake shoes are operated to control the brake power when a strong centrifugal force is applied to the spool, and the brake power is controlled by regulating the number of the operating brake shoes. As a result, the brake power to be applied to the spool can be selected and controlled, according to circumstances, so that the rotation of the spool can be ideally induced.

In particular, since the turning force of the spool is finely controlled by manipulating the adjustment dial, without detaching the main cover from the spool body during fishing, a beginner can conveniently use the bait cast reel.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings.

Figure 1:
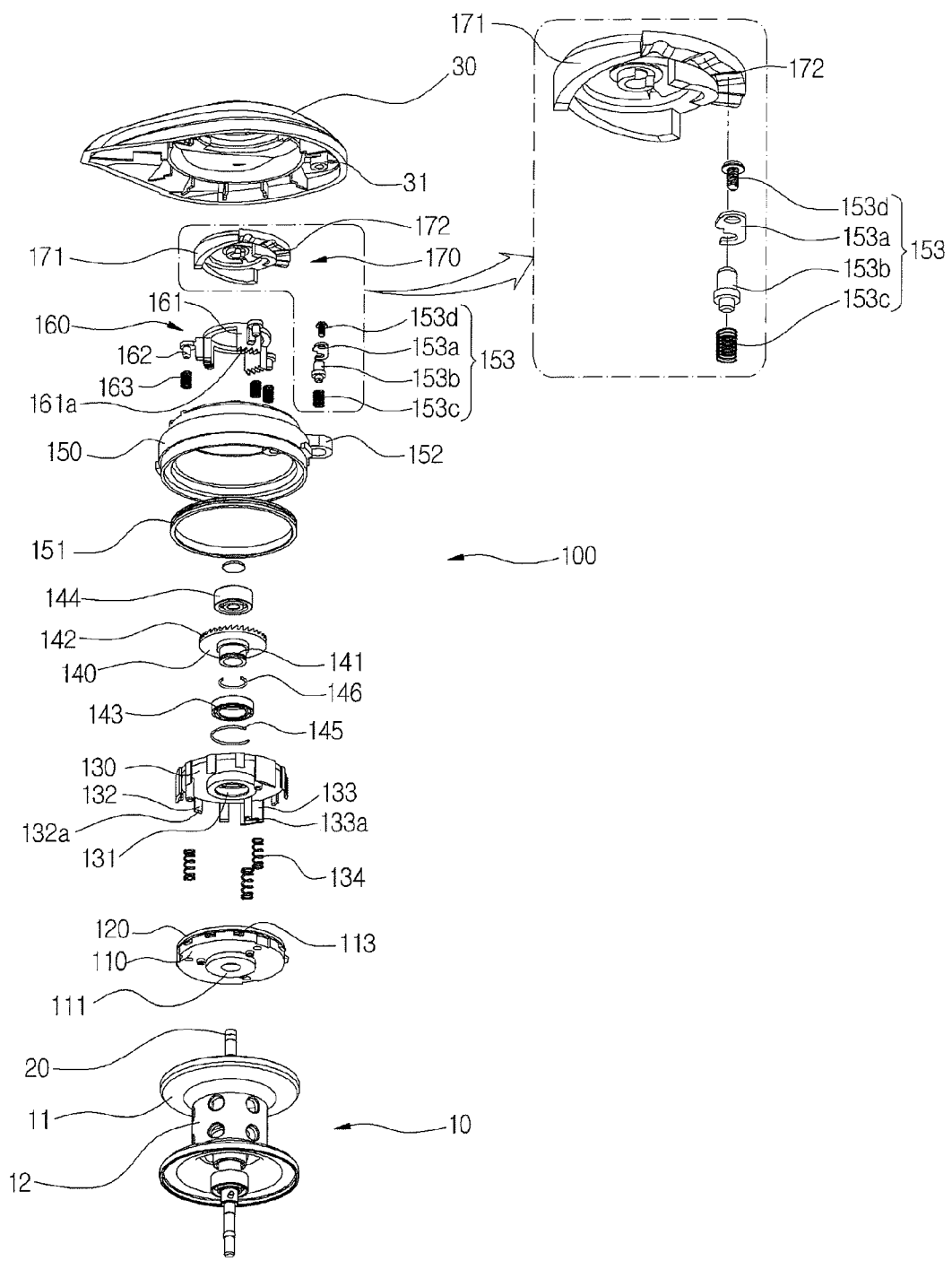
FIGS. 1 and 2 are exploded perspective views illustrating a centrifugal brake device for a bait cast reel according to the first embodiment of the present invention.
Figure 2:
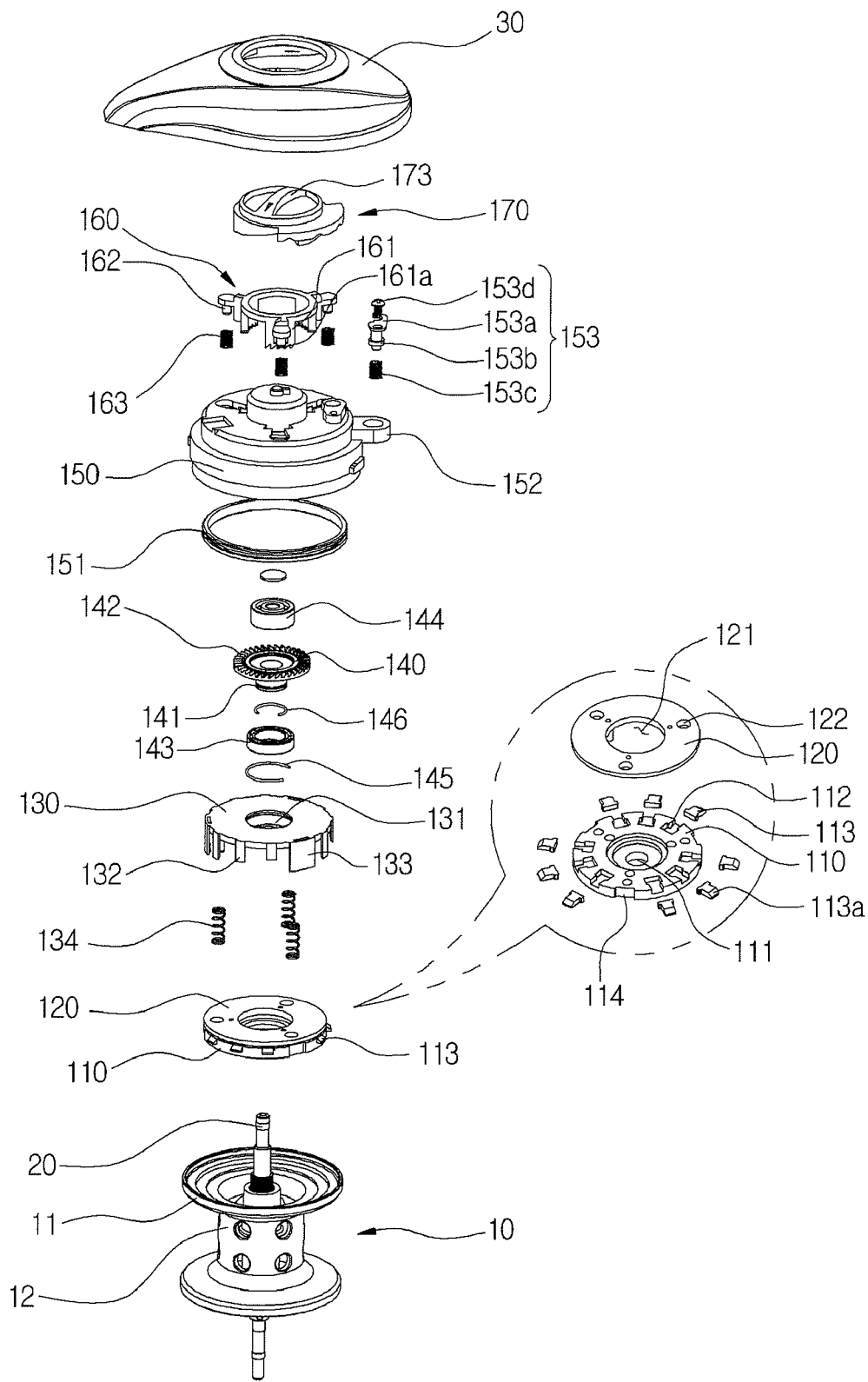

FIGS. 1 and 2 show a bait cast reel according to the first embodiment of the present invention.

A bait cast reel according to this embodiment includes a reel body 1 (FIGS. 3 and 4) and a spool 10 rotatably engaged to one side of the reel body. The spool 10 has flanges 11 formed in a shape of dish at both sides thereof, and a cylindrical winding portion 12 interposed between the both flanges 11. A spool shaft 20 is extended from both sides of the spool 10 through a center of the spool 10.

A centrifugal brake device 100 according to this embodiment includes a shoe housing 110 engaged to one side of the spool 10 and having a plurality of brake shoes 113, a stopper 130 positioned on an upper portion of the shoe housing 110 to restrict operation of the brake shoes 113, a spool cover 150 with a brake ring 151, a slide cam 160 engaged to the upper portion of the spool cover 150, and an adjustment dial 170 for adjusting brake power.

The shoe housing 110 having a plurality of brake shoes 113 is engaged to one side of the spool shaft 20, and is rotated together with the spool shaft 20.

The shoe housing 110 is formed in a disc so that the shoe housing is inserted into the flange 11 of the spool 10. The shoe housing 110 is provided at a center portion thereof with a shaft hole 111 for receiving the spool shaft 20. The shoe housing 110 is provided on an upper surface thereof with a plurality of slide grooves 112 concentrically disposed at regular intervals so that the brake shoes 113 are seated on the slide grooves.

A brake holder 120 of disc type is engaged to one side of the shoe housing 110 so that the brake shoes 113 are not released from the shoe housing 110 when the reel is operated, the brake holder 120 having a diameter corresponding to a diameter of the shoe housing 110. Accordingly, the brake holder 120 is engaged to the shoe housing 110 with the brake shoes 113 to prevent the brake shoes 113 from being released from the shoe housing 110 due to the centrifugal force generated from the spool 10. In this instance, a plurality of the brake shoes 113 (9 in this embodiment) are radially disposed in the slide grooves 112 of the shoe housing 110.

Spring seat grooves 122 are formed around the shaft hole 121 on one side of the brake holder 120 at regular intervals. Coil springs 134 are seated on the spring seat grooves 122 to resiliently support the stopper 130 which is moved up or down, with the coil springs 134 being interposed between the brake holder 120 and the stopper 130.

The stopper 130 for restricting exposure of the brake shoes 113 is disposed on one side of the shoe housing 110. The stopper 130 is formed in a disc, and is provided at a center portion thereof with a boss hole 131, through which a boss of a stopper controller 140 penetrates. The shoe housing 110 includes a plurality of stopper ribs 132 (9 in this embodiment i.e., equal to the number of the brake shoes 113) protruding from an edge thereof.

Three stopper ribs of 9 stopper ribs 132 which are located at a corresponding position have the same length. More specifically, 9 stopper ribs 132 have three kinds of length. Accordingly, 9 stopper ribs 132 are gradually released from an outer surface of the shoe housing 110 in order of length of the stopper rib by the resilient force of the coil spring 134. As a result, the brake shoes 113 are free from the restriction, and are contacted against the brake ring 151 to increase the brake power. More specifically, since the stopper 130 is resiliently supported by the coil spring 134, the stopper is raised by the coil spring 134 as the adjustment dial 170 is manipulated.

The brake shoes 113 and the stopper ribs 132 have tapered ends 113a and 132a, respectively, so that the protruding brake shoes 113 can be easily inserted into the shoe housing 110 when the stopper 130 is moved down.

Three assembling grooves 114 are formed on an outer surface of the shoe housing 110 at regular intervals, and three assembling pieces 133 protrude from an outer surface of the stopper 130 towards the shoe housing 110 to be engaged with the assembling grooves 114. An assembling boss 133a protrudes from an inner end of each assembling piece 133 to be engaged with the shoe housing 110, so that the stopper 130 is not easily disengaged from the shoe housing 110.

A stopper controller 140 is installed at one side of the stopper 130. A boss 141 protrudes from a bottom of the stopper controller 140, and a recessed portion 142 is formed on the upper edge of the stopper to mesh with protruding portions 161 of the slide cam 160. Intermeshment of the protruding portions 161 of the slide cam 160 with the recessed portion 142 of the stopper controller 140 prevents the slide cam 160 and the stopper controller 140 from being rotated. A ball bearing 143 which engages to the outside of the boss 141 of the stopper controller 140 is interposed between a retainer 146 engaged to the outside of the boss 141 and a retainer 145 engaged to the boss hole 131, so that the stopper 130 and the stopper controller 140 are integrally moved up and down, and are freely rotated in unison.

The protruding portions 161 of the slide cam 160 can be released from the recessed portion 142 of the stopper controller 140 due to instantaneously frictional force generated between the ball bearing 143 and the stopper controller 140 when initial casting, so that the stopper controller 140 can be rotated. In order to prevent the above situation, as shown in FIGS. 1 and 2, one side of the recessed portion 142 is inclined, while the other side of the recessed portion 142 is vertically formed in order to sufficiently withstand the turning force. Also, one side of the protruding portion 161 is vertically formed, while the other side is inclined. As a result, the protruding portion 161 is conformally fitted into the recessed portion. Even though instantaneously frictional force is generated, the stopper controller 140 and the slide cam 160 are not rotated since the intermeshment of the recessed portion 142 and the protruding portion 161 is maintained.

The spool cover 150 is engaged to one side of the stopper controller 140, and the spool cover 150 is engaged to the main cover 30.

The spool cover 150 has a desired space therein, and the space is provided with a brake ring 151 therein which is contacted against the brake shoes to apply the brake power to the brake shoes. At least one engaging portion 152 protrudes from an outer surface of the spool cover 150, and is engaged to an engaging boss 31 of the main cover 30 by means of a coupling member (not shown).

If the fishing line is unwound from the rotating spool, the shoe housing 110 engaged to the spool shaft 20 is also rotated. In this instance, if the shoe housing 110 is rotated at speed above a specific speed, the brake shoes 113 engaged to the shoe housing 110 are radially spread out by the centrifugal force of the shoe housing 110.

After that, the brake shoes 113 comes in contact with the brake ring 151 which is provided in the spool cover 150, the rotational speed of the spool 10 is decreased due to the frictional force generated by mutual contact between the brake shoes 113 and the brake ring 151, thereby preventing the backlash.

A click member 153 is engaged to the upper surface of the spool cover 150, and includes a support piece 153a, a plunger 153b, a spring 153c, and a screw 153d, the plunger 153b and the screw 153d being resiliently supported by the spring 153c. The click member 153 is located at a position corresponding to a stepped portion 172 of the adjustment dial 170, so that a user can identify an adjusting step of the adjustment dial 170.

The spool cover 150 is provided on the upper portion thereof with a ball bearing 144, and the upper end of the spool shaft 20 is supported by the spool cover 150, the spool shaft 20 being freely rotated together with the spool cover 150.

The slide cam 160 is formed in shape of disc, and is disposed on the upper portion of the spool cover 150, with a coil spring 163 being interposed between the slide cam 160 and the spool cover 150.

3 protruding portions 161 are provided on the edge of the slide cam 160 at regular intervals, and a recessed portion 161a is formed on a bottom of ach protruding portion 161, so that the protruding portion 161 is meshed with the upper surface of the stopper controller 140. A spring boss 162 is provided on the outer side of each protruding portion 161, and a coil spring 163 is mounted on the spring boss 162, so that the slide cam 160 is resiliently supported by the spool cover 150.

The adjustment dial 170 is formed in shape of disc, and is seated on the upper surface of the spool cover 150. 3 circular displacement portions 171 protrude downwardly from the bottom of the adjustment dial 170 at regular intervals to control the slide cam 160 by stages. A knob 173 protrudes vertically from the upper surface of the adjustment dial 170.

The multi-stage stepped portion 172 is formed on one side of any one of the displacement portions 171, in which the stepped portion is formed in three stages in this embodiment. The click member 153 is interposed between the stepped portion 172 and the spool cover 150 to allow a user to verify the stage of adjusting the brake power of the adjustment dial 170.

The main cover 30 may be provided with an index (not shown) to display the multi-stage levels of the brake power so that the user can verify the current level.

The operation of the centrifugal brake device according to the first embodiment of the present invention will now be described with reference to FIGS. 3 to 5.

When casting, the spool 10 is rotated at high speed, the centrifugal brake device assembled to the spool shaft 20 is also rotated at the same speed as the rotational speed of the spool 10. As a result, strong centrifugal force is generated from the centrifugal brake device, and then is radially applied to the spool shaft 20, so that the brake shoes 113 are spread out towards the brake ring 151. The brake shoes 113 come in contact with the inner surface of the brake ring 151 to generate the frictional force, and thus the rotation of the spool 10 is controlled.

When the casting speed of the fishing line is decreased and is dropped, the rotational speed of the spool 10 is also decreased. As a result, since the centrifugal power is decreased and the frictional force is also decreased, the rotation of the spool is continuously maintained.

The shift distance of the brake shoes 113 is naturally adjusted in accordance with the intensity of the centrifugal power, and thus the frictional force generated between the brake shoes 113 and the inner surface of the brake ring 151 is naturally adjusted in accordance with the intensity of the centrifugal power. Therefore, the backlash can be prevented by the adjusted brake power, so that a user can employ precision fishing technique.

Meanwhile, a user can adjust the brake power by manipulating the adjustment dial 170 when casting. More specifically, the number of the brake shoes 113 can be selected in accordance with a kind of fishing and a user's taste in fishing.

Figure 3:
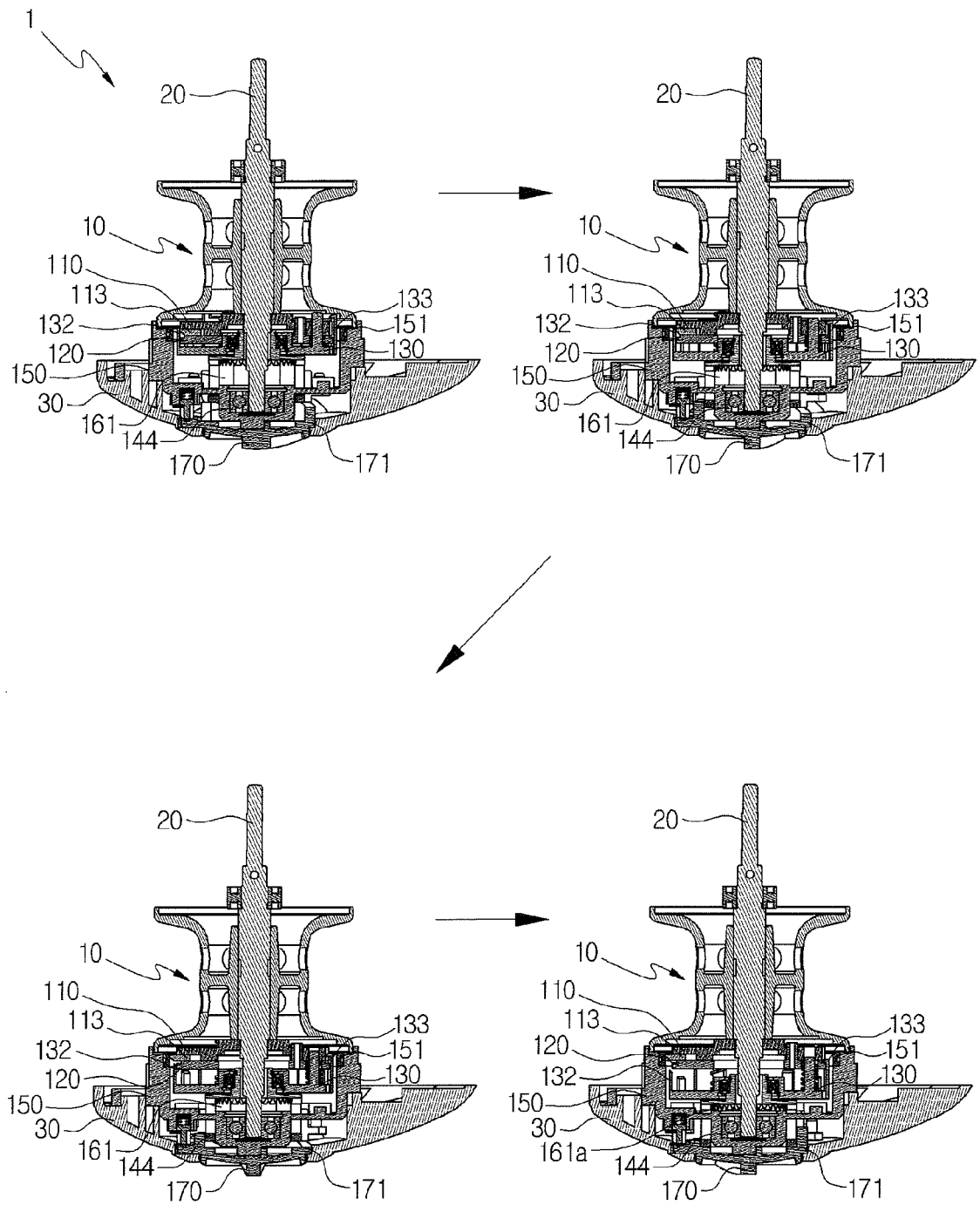
FIGS. 3 to 5 are partially cross-sectional views illustrating the operating process of a centrifugal brake device according to the first embodiment of the present invention.
Figure 4:
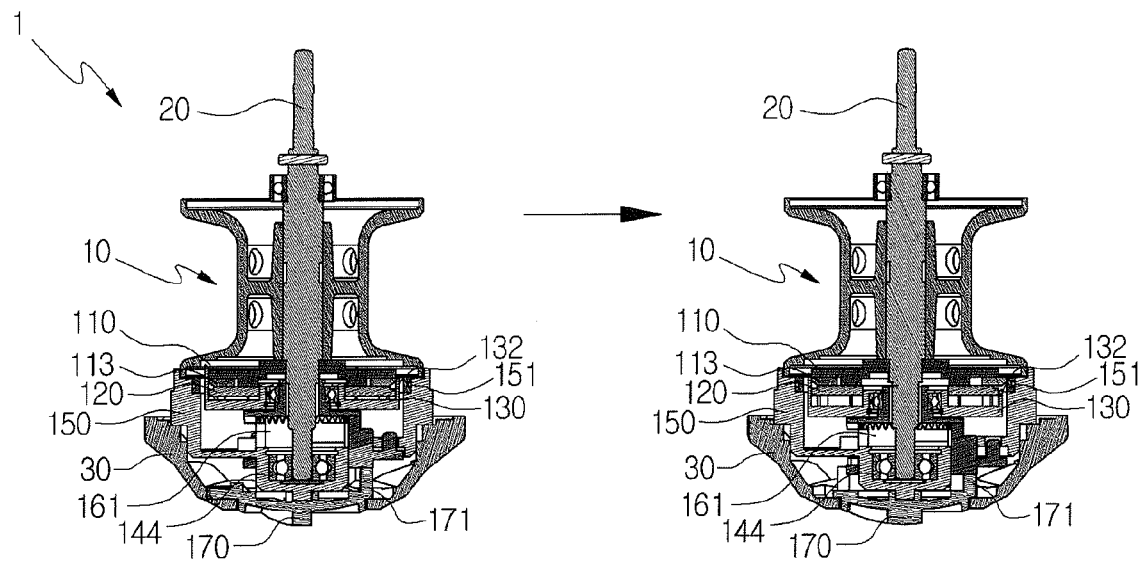
Figure 4:
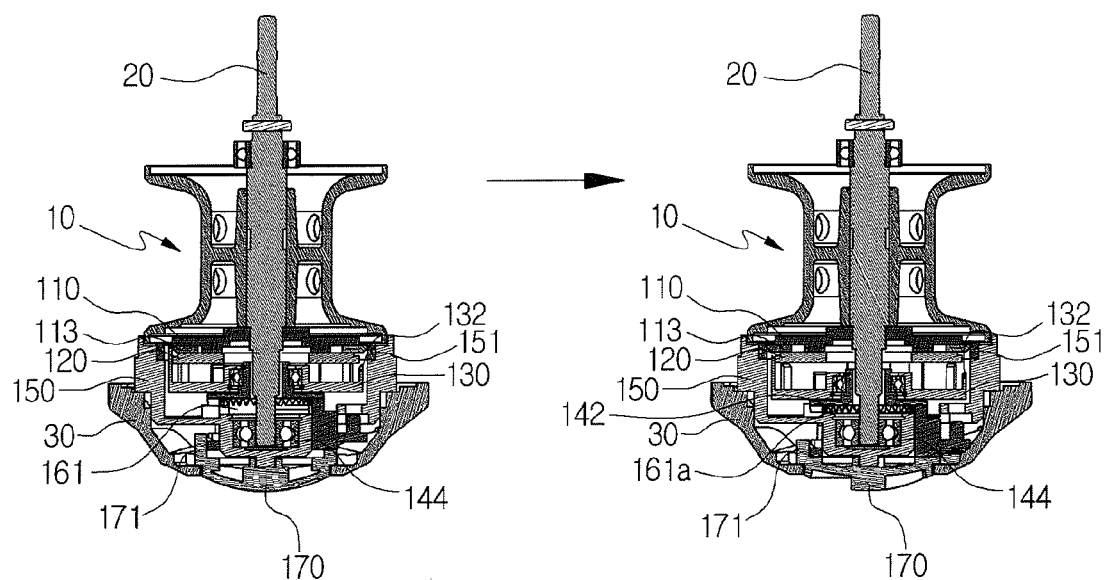
Figure 5:
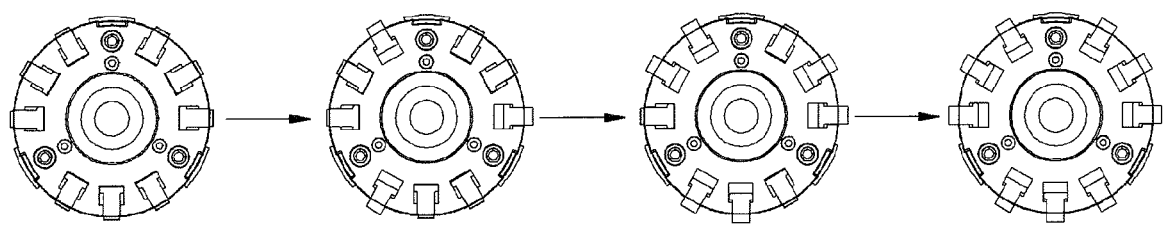

For example, as shown in FIGS. 3 to 5, in state where all brake shoes 113 engaged to the shoe housing 110 are blocked by the stopper ribs 132 not to generate the brake power, that is, the adjustment dial 170 indicates zero level of the brake power on the main cover 30, if the level is increased by one step by manipulating the adjustment dial 170, the slide cam 160 is moved down by one step by the displacement portions 171 of the adjustment dial 170 (see FIGS. 3 and 4), and the stopper 130 and the stopper controller 140 which care resiliently supported by the slide cam 160 are also moved down, so that the stopper ribs 132 of the shortest length are released from the brake shoes 113.

As a result, the brake shoes 113 blocked by the stopper ribs 132 of the shortest length protrude by the centrifugal force to come in contact with the brake ring 151.

If the level of the brake power is selected as the maximum level (e.g., 3 step) by gradually rotating the adjustment dial 170, the slide cam 160 and the stopper 130 are moved in a direction opposite to the spool 10, and the all brake shoes 113 are released from the stopper rib 132 to come in contact with the brake ring 151, irrespective of the length of the respective stopper ribs 132, thereby applying the maximum brake power to the spool.

Figure 6:
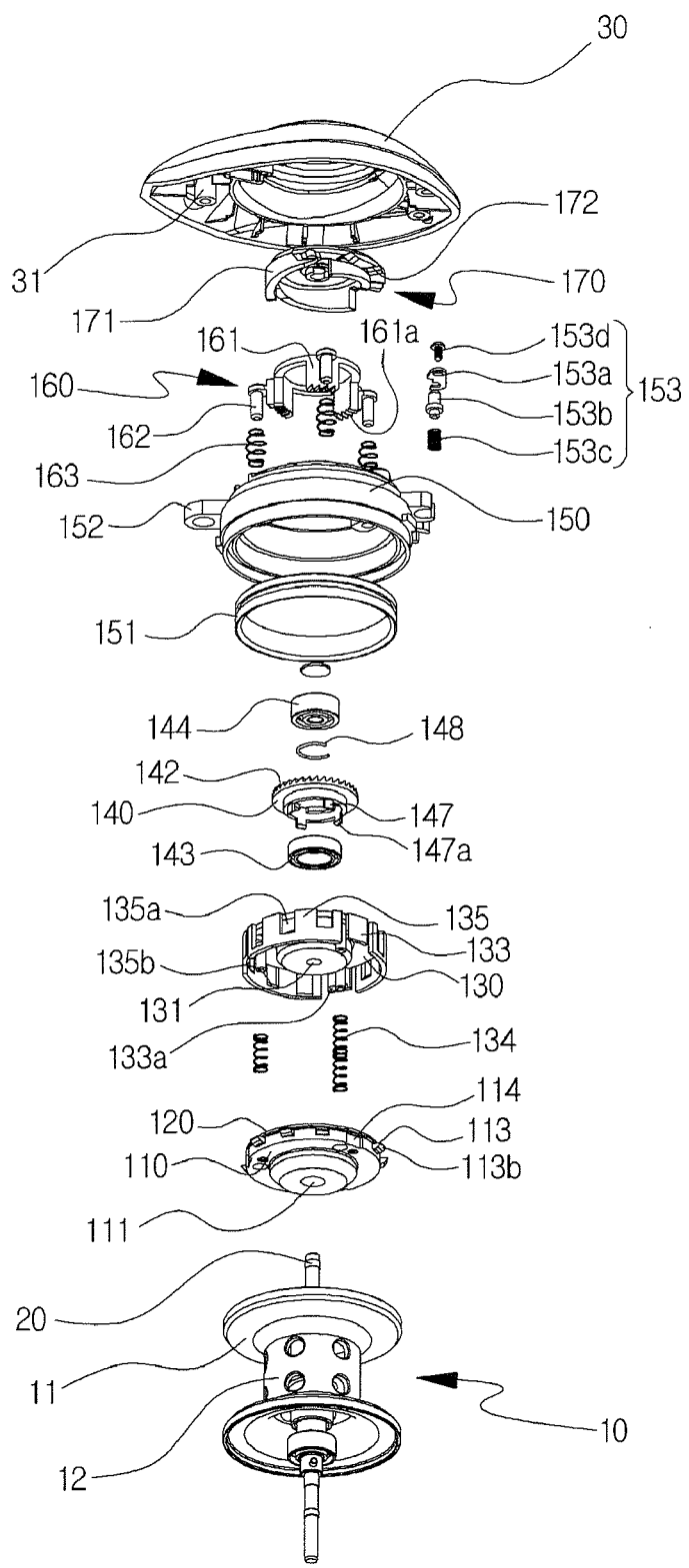
FIGS. 6 and 7 are exploded perspective views illustrating a centrifugal brake device for a bait cast reel according to the second embodiment of the present invention.
Figure 7:
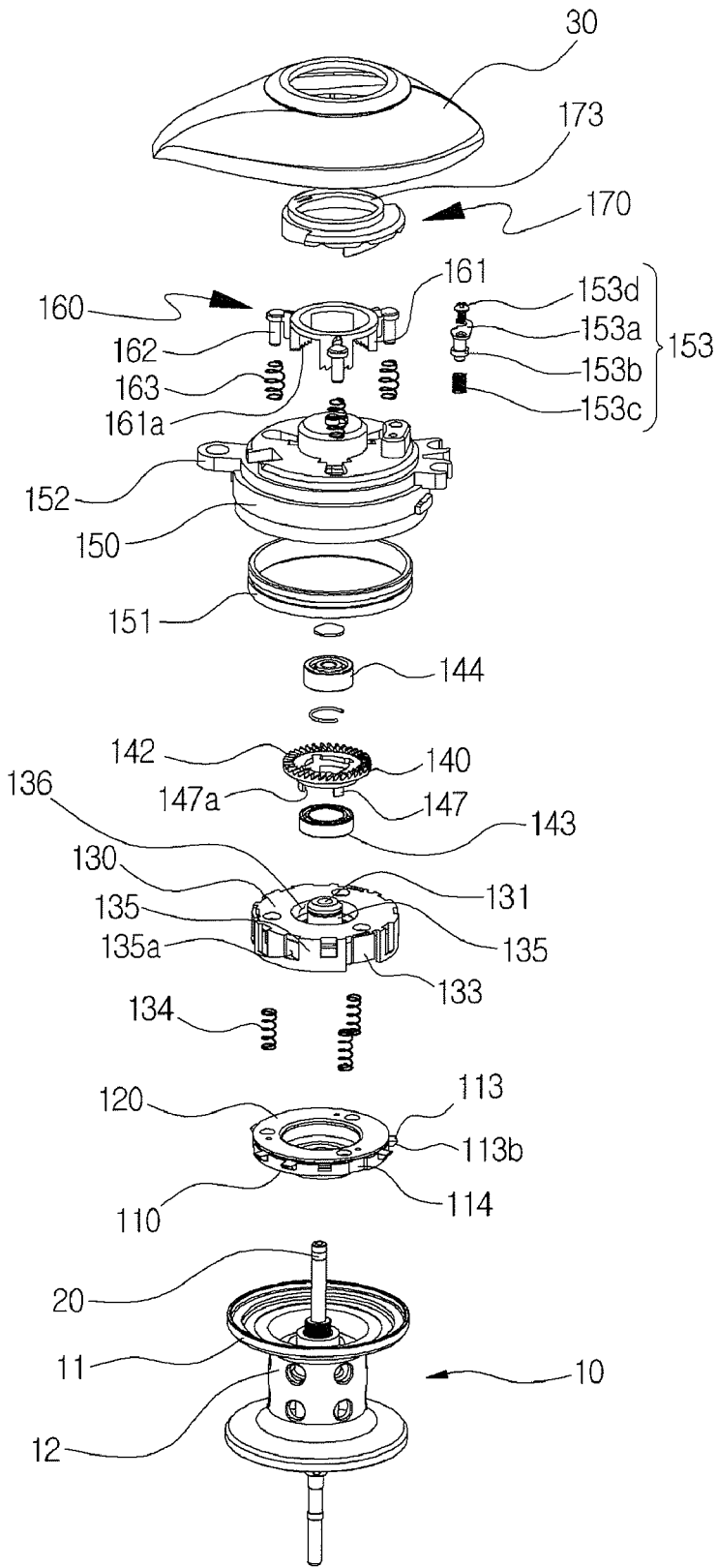

FIGS. 6 and 7 show a bait cast reel according to the second embodiment of the present invention.

The same reference numerals are used to designate the same or similar components as those shown in FIGS. 1 and 2, and repetition of the description on the same or similar components will be omitted.

The bait cast reel according to the embodiment includes a modified stopper 130. More specifically, the shoe housing 110 includes a stopper 130 with a plurality of stopper guiders 135 (9 in this embodiment, i.e., equal to the number of the brake shoes 113) protruding from the edge of the stopper 130, the stopper guiders having grooves 135a, instead of the stopper ribs 132 formed on the stopper 130 according to the first embodiment.

In this instance, the stopper guides 135 may consist of three stopper guides 135 formed at three positions on the edge of the stopper 130, in which assembling pieces 133 shown in the first embodiment are interposed between the stopper guides 135.

Three grooves 135a are formed on each stopper guider 135, so that 9 grooves 135a are formed on three stopper guiders 135 in total. Three grooves located at the corresponding position among 9 grooves 135a have the same length. That is, 9 grooves 135a have three kinds of length.

The respective brake shoes 113 and the stopper guiders 135 with the grooves 135a have inclined surfaces 113b and 135b, with the portion being gradually tapered towards its end.

In this instance, the inclined surface 113b formed on each brake shoe 113a is formed on the lower surface of the brake shoe 113 (see FIGS. 6 and 7), different from the inclined surface 113a in the first embodiment (formed on the upper surface of the brake shoe shown in FIGS. 1 and 2).

The inclined surface 135b formed on the stopper guider 135 is formed in correspondence with the inclined surface 113b formed on the brake shoe 113, so that the brake shoes 113 can be easily inserted into the shoe housing 110.

There is a difference between the second embodiment and the first embodiment in the engagement structure of the stopper 130 and the stopper controller 140.

More specifically, a plurality of locking portions 147 protrude downwardly from the stopper controller 140, and are spaced apart from each other in a radial direction, contrary to the bosses 141 in the first embodiment. The locking portions 147 enclose the outer surface of the ball bearing 143, and a locking boss 147a protrudes inwardly from the lower end to support the lower end of the ball bearing 143.

The stopper 130 is provided on the upper surface thereof with a boss 135 with a hole, through which the spool shaft 20 is inserted. A groove 136 is formed on the boss 135 is formed around the boss 135, so that the locking portions 147 and the ball bearing 143 are inserted into the groove 136. A retainer 148 is engaged to the outer portion of the boss 135 to support the ball bearing 143.

More specifically, the ball bearing 143 is engaged to the outer portion of the boss 135, and is interposed between the locking bosses 147a and the retainer 148. The stopper 130 and the controller 140 are coupled to each other so that the stopper and the controller are integrally moved up and down and freely rotated by the ball bearing 143.

In this embodiment, since the slide cam 160 is released from the stopper controller 140 at the minimum level of the brake power (zero step), a desired space is formed between the slide cam 160 and the stopper controller 140 as the slide cam 160 is moved to the uppermost position.

The slide cam 160 is moved up by the coil spring 163 in accordance with the operation of the minimum level of the adjustment dial 170. At the same time, the stopper controller 140 is moved up together with the stopper 130 which is moved up by the spring 134.

At that time, as the assembling pieces 133 of the stopper 130 are moved up along the assembling groove 144, the assembled bosses 133a formed on the inner end of the assembling portions 133 are abutted against the lower edge of the brake holder 120. As a result, lifting of the stopper 130 and the stopper controller 140 is stopped.

After the slide cam 160 is moved up by the minimum level, the movement of the slide cam is stopped. Thus, the slide cam 160 is spaced apart from the stopper controller 140 to release the intermeshment therebetween.

It is to prevent the stopper controller 140 from being affected by the stopped slide cam 160 at the minimum level of the brake power. As a result, rotation of the spool is not affected by the slide cam 160.

In other words, if the intermesh between the slide cam 160 and the stopper controller 140 is maintained at the minimum level of the brake power, the stopper controller 140 is not rotated by the stopped slide cap 160. In this instance, even through the stopper controller 140 intermeshed with the stopper 130 is freely rotated by the ball bearing 143, the frictional resistance of the ball bearing incurs a loss in the turning force of the spool 10 rotating with the stopper 130. Accordingly, if the slide cam 160 is released from the stopper controller 140 at the minimum level of the brake power in this embodiment, even the frictional resistance is not generated.

Figure 8:
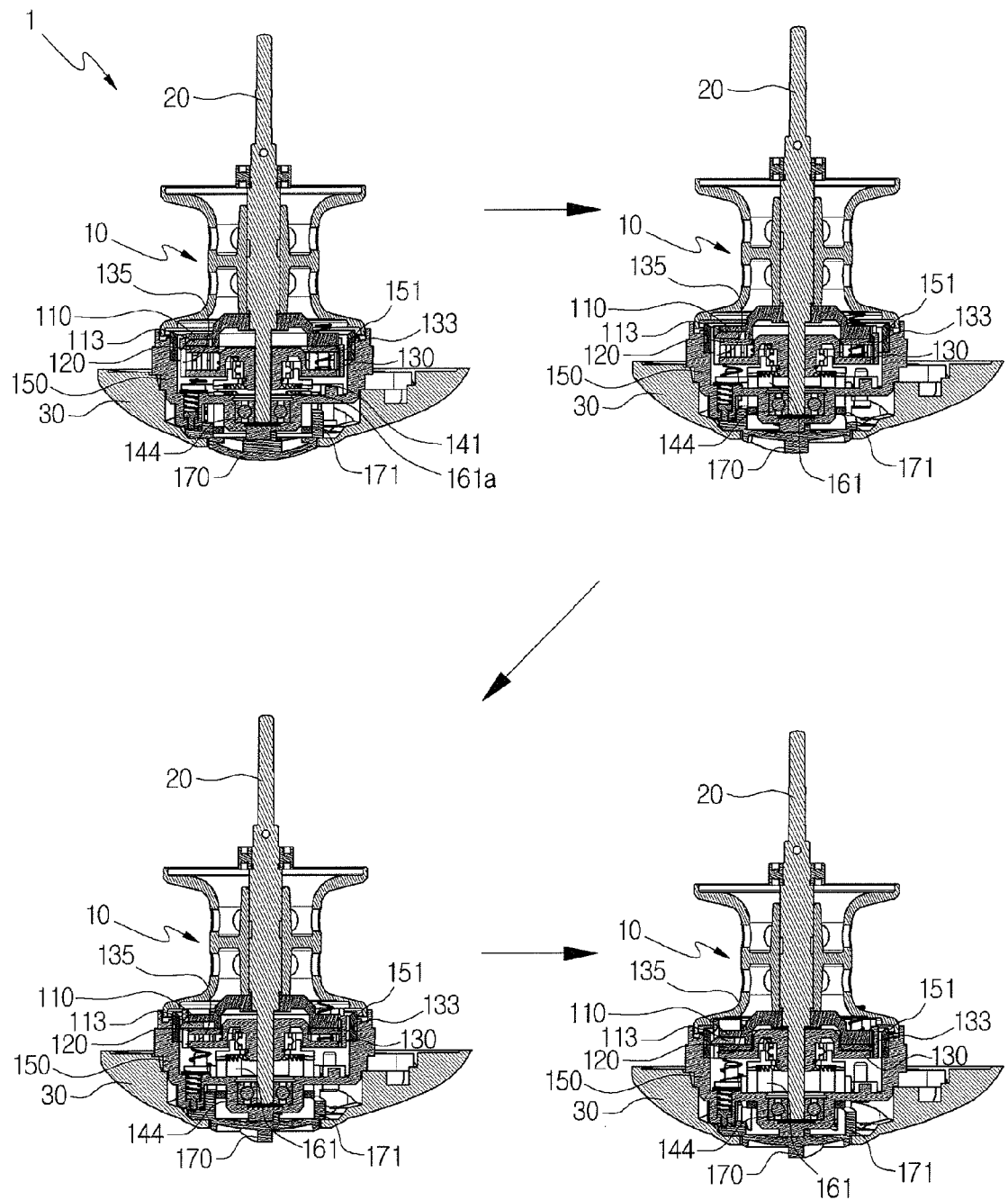
FIGS. 8 and 9 are partially cross-sectional views illustrating the operating process of a centrifugal brake device according to the second embodiment of the present invention.
Figure 9:
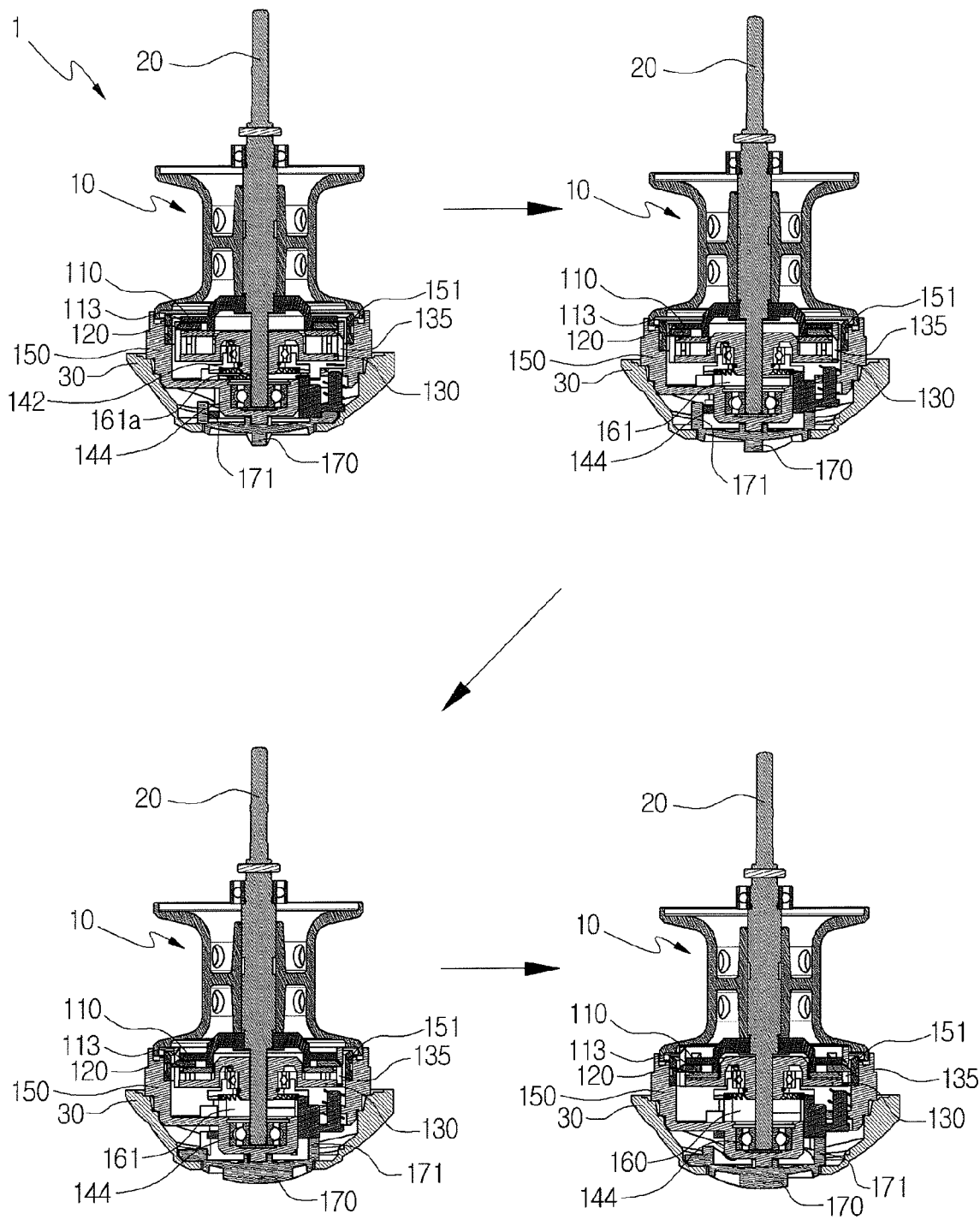

The operation of the centrifugal brake device according to the second embodiment of the present invention will now be described with reference to FIGS. 8 and 9, in which a direction described hereinafter is set on the basis of FIGS. 8 and 9.

In this embodiment, the slide cam 160 is moved up and down by manipulating the adjustment dial 170, and the stopper 130 and the stopper controller 140 are moved up and down in unison by the upward or downward movement of the slide cam 160, as described in the first embodiment.

This embodiment is different from the first embodiment in that when the adjustment dial is set from the minimum level of the brake power (zero stage) to the maximum level (3 stage) in this embodiment, the stopper 130 is gradually moved from the position farthest away from the spool 10 towards the spool 10.

More specifically, when the brake power is controlled by manipulating the adjustment dial 170, the stopper is located at the position farthest away from the spool, in the state the adjustment dial 170 indicates the minimum level of the brake power on the main cover 30. In this instance, all brake shoes 113 engaged to the shoe housing 110 are blocked by the stopper guider 135 not to apply the brake power to the spool. The stopper controller 140 and the slide cam 160 are spaced apart from each other, and the intermeshment therebetweeen is thus released.

If the adjustment dial 170 is manipulated by one step, the slide cam 160 is moved up by one step by means of the displacement portions 171. After the slide cam 160 is meshed with the stopper controller 140 during the upward movement, the stopper controller 140 and the stopper 130 are moved up together with the slide cam 160. The brake shoes 113 corresponding to the groove 135a of the longest length are released from the closed state.

Accordingly, the brake shoes 113 blocked by the stopper guiders 135 with the groove 135a of the longest length protrude in radial direction through the groove 135a by the centrifugal power to come in contact with the brake ring 151.

If the adjustment dial 170 is rotated and set as the maximum level of the brake power, the slide cam 160 and the stopper 130 are gradually moved towards the spool 10. All of the brake shoes 113 are released from the stopper guiders 135 to come in contact with the brake ring 151, irrespective of the length of each groove 145, thereby applying the maximum brake power to the spool.

The number of the brake shoes 113 protruding every stage will be referred to the description of FIG. 5 in the first embodiment.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A centrifugal brake device for a bait cast reel comprising:
a shoe housing engaged to one side of a spool and including a plurality of brake shoes disposed in a radial direction;
a stopper positioned on an upper portion of the shoe housing to restrict the brake shoes;
a stopper controller engaged to an upper portion of the stopper to control a lifting position of the stopper;
a spool cover enclosing the shoe housing and including a brake ring engaged to an inner surface of the spool cover, the brake shoes coming into contact with the brake ring when the brake shoes are released from the stopper;
a slide cam engaged to one side of the spool cover to control a lifting position of the stopper controller, with a spring being interposed between the slide cam and the spool cover; and
an adjustment dial for gradually adjusting a lifting degree of the slide cam, the adjustment dial being provided with displacement portions on a surface thereof contacting the slide cam:
wherein at least one spring is interposed between the stopper and the shoe housing.

2. The centrifugal brake device of claim 1, wherein at least one assembling groove is formed on an outer surface of the shoe housing, and an assembling piece protrudes from the stopper, the assembling piece being engaged with the at least one assembling groove.

3. The centrifugal brake device of claim 1, wherein the stopper includes a plurality of stopper ribs of different length protruding towards the shoe housing, the number of the stopper ribs being corresponding to the number of the brake shoes.

4. The centrifugal brake device of claim 3, wherein the brake shoes and the stopper ribs have tapered ends.

5. The centrifugal brake device of claim 1, wherein a stopper guider protrudes from the stopper towards the shoe housing, and is provided with grooves of different length, the number of the grooves being corresponding to the number of the brake shoes.

6. The centrifugal brake device of claim 5, wherein the brake shoes and the grooves include tapered ends.

7. The centrifugal brake device of claim 1, wherein the stopper controller is provided with an upper surface thereof with a recessed portion, and the slide cam is provided on a bottom thereof with protruding pieces which are meshed with the recessed portion.

8. The centrifugal brake device of claim 7, wherein one side of the recessed portion formed on the upper surface of the stopper controller is inclined, and the other side is vertically formed, and wherein one side of the protruding piece formed on the bottom of the slide cam is vertically formed, and the other side is inclined, so that the protruding piece is meshed with the recessed portion.

9. The centrifugal brake device of claim 1 wherein the displacement portions are provided on one side thereof with a multi-stage stepped portion.

10. The centrifugal brake device of claim 1, wherein the shoe housing is engaged to a brake holder to prevent the brake shoes from being released.

11. The centrifugal brake device of claim 10, wherein the at least one spring is interposed between the brake holder and the stopper.

12. The centrifugal brake device of claim 1, wherein a ball bearing is interposed between the stopper and the stopper controller.

* * * * *